Jan. 24, 1933.  W. T. CANTLON  1,895,375
WEEDING ATTACHMENT TO PLOWS
Filed Feb. 16, 1931

Inventor
W. T. Cantlon

Patented Jan. 24, 1933

1,895,375

UNITED STATES PATENT OFFICE

WILLIAM T. CANTLON, OF CARTWRIGHT, MANITOBA, CANADA

WEEDING ATTACHMENT TO PLOWS

Application filed February 16, 1931, Serial No. 515,994, and in Canada July 28, 1930.

The invention relates to improvements in weeding attachments particularly designed for use on ploughs and an object of the invention is to provide a weeding attachment which can be readily incorporated as part of the plough structure and which embodies a driven rotary pronged weeder mounted on the plough frame and adapted when the plough is in use to strike the earth turned by the mould board and separate the weeds from the same and pitch them rearwardly to be subsequently killed by exposure to sun and weather.

A further object is to associate deflecting forks with the plough frame adapted to catch and deflect the extracted weeds and discharge the same on the soil surface and further to provide a shield for the rotary weeder to protect the plough operator.

A further object is to construct the attachment so that it can be readily mounted on the existing type of plough without requiring any material alteration in the structure thereof.

A further object is to arrange the prongs so that they can be adjusted in length and also to provide an arrangement whereby if an obstruction be encountered, the rotary weeder will not be seriously damaged.

With the above more important and other minor objects in view, the invention consists essentially in the arrangement and construction of parts hereinafter more particularly described, reference being had to the accompanying drawing, in which:—

In the drawing like characters of reference indicate corresponding parts in the several figures.

Figure 1:
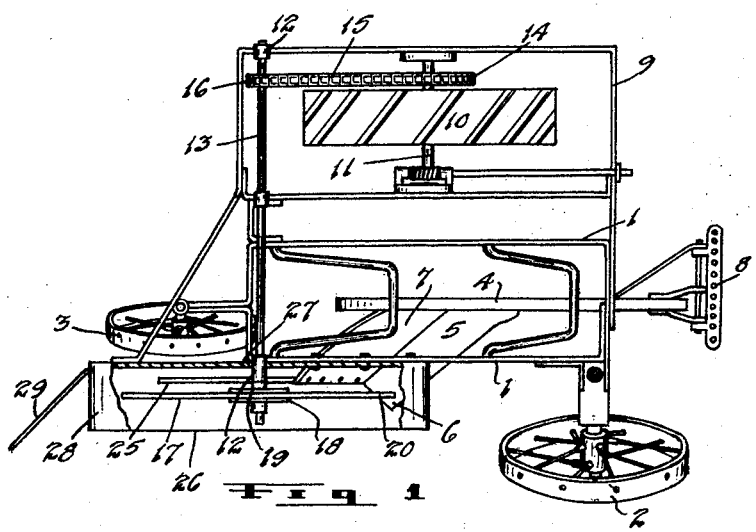
Fig. 1 is a plan view of a sulky plough equipped with my invention, certain parts of the plough being omitted.

The sulky plough herein shown is of the well known conventional type and I have not considered it necessary on such account to give a detailed description of all the parts shown nor to show all the parts of the sulky plough.

The frame 1 of the plough is substantially rectangular and it is supported as is usual at one of the front corners by the front furrow wheel 2 and it is also rearwardly supported in the usual manner by the rear furrow wheel 3. The plough beam 4 which is carried in the usual manner by the plough frame is supplied with a plough proper 5 embodying the customary share 6, mould board 7 and land side (not herein shown). The forward end of the plough beam is provided with the conventional hitch 8.

Customarily, the plough frame is provided more or less centrally at the side remote from the front furrow wheel with what is known as a land wheel. According to my invention, I remove the land wheel, the shaft supporting the same and other elements associated therewith and provide the plough frame at that side with an extension frame 9 in which I mount a bull or master wheel 10, the master wheel being carried by a drive shaft 11. This drive shaft is adjustably mounted in respect to the frame so that the frame can be raised or lowered in respect to the ground as desired. The adjustment which I provide for the latter shaft is the same as that now used on harvesting machines or binders now marketed and embodies the well known segments, gear wheels, worm and worm shaft herein indicated but not further described.

Rearwardly the plough frame and the extension frame are provided with suitable bearings 12 for a counter shaft 13 and the counter shaft projects beyond the side of the plough frame remote from the extension frame. Suitable means is provided whereby the shaft 11 drives the counter shaft, such being herein shown as a chain wheel 14 secured to the main shaft and provided with a chain 15 which operates over a considerably smaller chain wheel 16 secured to the counter shaft.

The arrangement is such that the counter shaft is driven at a considerably higher speed than the main shaft.

To the end of the counter shaft extending beyond the plough frame, I secure a rotary pronged weeder indicated generally by the reference numeral 17 and in the present instance, the weeder is made as follows. To the counter shaft, I secure in any suitable manner a pair of opposing spaced discs 18 and 19 and between the discs, I locate the inner ends of a plurality of similar radially disposed equi-spaced prongs 20, the prongs having their outer ends slightly curved as shown best in Figure 2. The inner ends of the prongs are fastened to the discs. In actual practice, I have provided two slots 21 and 22 in each prong and the slot 22 receives a fastening bolt 23 carried by the discs and the slot 21 receives a wooden pin 24 also carried by the discs.

The arrangement is such that when the nut 23' of the bolt is loosened, one can end shift the prong to make it sweep a larger or lesser circle depending on the adjustment given. Upon tightening up the nut, the prong is effectively jammed between the discs. By providing the wooden pins which will be preferably of hard wood, I contemplate that if an obstruction is met, the wooden pins will be sheared so that nothing will be seriously damaged as it is an easy matter to substitute a new wooden pin for the sheared one.

It will be observed that the rotary pronged weeder is located to the rear and to the side of the plough 5 and I consider it desirable to have the rear end of the mould board terminated in a vertical plane lying immediately to the inner side of the rotary weeder. In practice, the existing mould board can be used by cutting off the rear end of the mould board so that it will appear as shown in the drawing.

Figure 2:
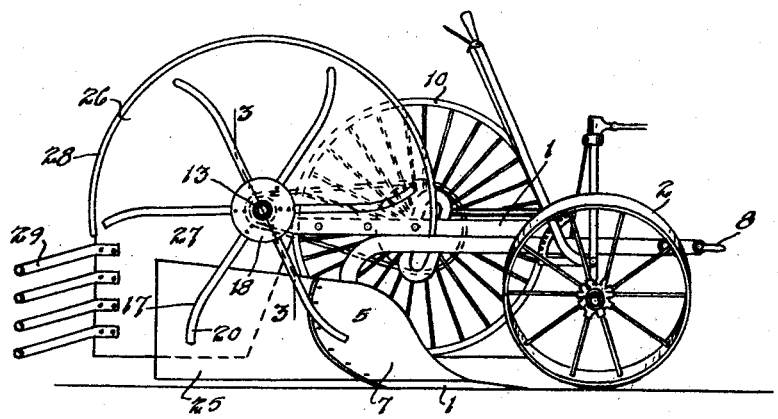
Fig. 2 is a side view of the parts appearing in Figure 1.
Figures 3, 4:
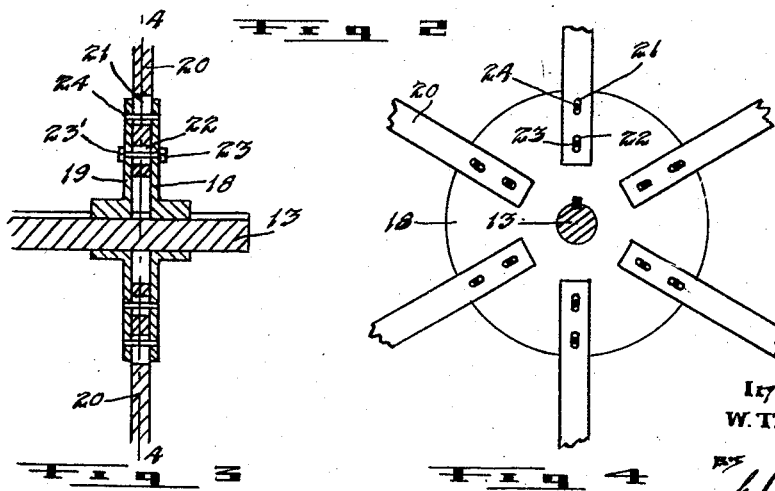
Fig. 3 is an enlarged detailed sectional view at 3—3 Figure 2.
Fig. 4 is an enlarged detailed vertical sectional view at 4—4 Figure 3.

When the sulky plough is in use, the bull wheel will drive the rotary weeder at a fairly high speed and in the direction of the applied arrow Figure 2 and the rotary weeder is so located in respect to the mould board that the prongs thereof will strike the ploughed earth deflected by the mould board and loosen the weeds and weed roots therefrom and pitch the same rearward.

In order to keep the weeds clear of the rear furrow wheel, I have attached the forward end of a vertically disposed guard plate 25 to the rear end of the mould board 7 and this plate extends rearwardly far enough to positively prevent weeds from reaching the said furrow wheel.

I have considered it desirable to provide a shield 26 for the rotary weeder in order to protect the plough operator. This shield is secured permanently to the plough frame and presents a vertical plate 27 which carries an outstanding guard flange 28 overlying the upper half of the weeder. The plate 27 extends downwardly towards the ground as shown and to the rear edge of it, I secure a plurality of horizontally disposed equi-spaced similar deflecting forks 29 inclined rearwardly and downwardly at a considerable angle and arranged so that the trash thrown back by the rotary weeder will strike the forks and the weeds will be caught and deflected in a direction away from the machine and scattered on the ground.

While I have entered into a detailed description of the various parts of the invention, it will be readily understood that the same can be materially modified without departing from the spirit of the invention as set forth in the appended claims and further it will be understood that while I have described the invention as applied in a sulky plough, it may be used on other types of ploughs to equal advantage as the essential feature of the invention resides more particularly in the provision of a driven rotary weeder positioned in respect to the earth turned by the ploughsshare that it strikes such earth as it leaves the mould board, loosens the weeds therefrom and thrusts the same rearwardly, rather than in the particular details of the various parts utilized to accomplish such object.

The means used for driving the rotary weeder may of course vary depending on the type of plough used and in this regard, I might point out that if the plough is to be drawn by a tractor having a power take off, suitable driving elements can be readily mounted on the plough and utilized as a driving connection between the power take off and the rotary weeder.

What I claim as my invention is:—

1. The combination with a plough, of a suitably mounted rotary pronged weeder positioned and driven so that the prongs will sweep rearwardly across the path of travel of the soil discharging from the plough mould board and deflecting prongs located rearwardly of the weeder.

2. The combination with a plough, of a suitably mounted rotary pronged weeder positioned and driven so that the prongs will sweep rearwardly across the path of travel of the soil discharging from the plough mould board, deflecting prongs located rearwardly of the weeder and a guard plate located to the inner side of the weeder.

3. The combination with a plough frame and a plough associated with the frame, said plough having the delivery end of the mould board thereof cut to terminate in a substantially vertical plane, of a rotatably mounted counter shaft located rearwardly of the frame, a pronged weeder mounted on the counter shaft and positioned adjacent the delivery end of the mould board, means for driving the counter shaft to cause the prongs to sweep rearwardly across the path of travel of the soil discharging from the mould board, a guard plate at the inner side of the weeder and deflecting prongs located rearwardly of the weeder and carried by the frame.

4. The combination with a sulky plough having the discharging end of the mould board cut to terminate in a substantially vertical plane, of an extension frame secured to the plough frame, a ground wheel carried by the extension frame, a counter shaft rotatably carried by the extension frame and extending transversely across the rear part of the plough frame, a rotary pronged weeder secured to the counter shaft and located adjacent the discharging end of the mould board and driving connections between the ground wheel and the counter shaft adapted to rotate the weeder in a clockwise direction to cause the prongs thereof to sweep rearwardly across the path of travel of the soil discharging from the mould board.

5. The combination with a sulky plough having the discharging end of the mould board cut to terminate in a substantially vertical plane, of an extension frame secured to the plough frame, a ground wheel carried by the extension frame, a counter shaft rotatably carried by the extension frame and extending transversely across the rear part of the plough frame, a rotary pronged weeder secured to the counter shaft and located adjacent the discharging end of the mould board, driving connections between the ground wheel and the counter shaft adapted to rotate the weeder in a clockwise direction to cause the prongs thereof to sweep rearwardly across the path of travel of the soil discharging from the mould board, deflecting prongs carried by the frame and to the rear of the weeder, and a guard plate carried by the mould board and extending rearwardly at the inner side of the weeder.

6. The combination with a plough, of a suitably mounted rotary pronged weeder positioned and driven so that the prongs will sweep rearwardly across the path of travel of the soil discharging from the plough mould board, a shield secured to the frame and overlying the upper part of the weeder and a plurality of deflecting prongs carried by the shield and located to the rear of the weeder and adapted to catch the weeds discharged by the weeder and deflect them in a direction away from the machine.

Signed at Winnipeg, this 20 day of November, 1930.

WILLIAM T. CANTLON.